Patented Sept. 13, 1949

2,481,824

UNITED STATES PATENT OFFICE 2,481,824

DEHYDROGENATION OF HYDROCARBON OIL AND CATALYST THEREFOR

William H. Claussen and Homer B. Wellman, Berkeley, Calif., assignors, by mesne assignments, to California Research Corporation, San Francisco, Calif., a corporation of Delaware No Drawing. Application October 4, 1944, Serial No. 557,236

2 Claims. (Cl. 196—78)

This invention pertains to the catalytic treatment of hydrocarbon distillates, and more particularly to the composition and method of preparation of a particular type of solid catalyst which has been found especially useful in the antiknock improvement of gasolines and in the conversion of low boiling petroleum fractions to aromatics.

This application is a continuation-in-part of our application Serial No. 446,528, filed June 10, 1942, and now abandoned.

The use of molybdenum-containing catalysts, such as molybdenum oxide supported on active charcoal, activated silica or activated alumina, has been proposed for effecting various hydrocarbon reactions. While the best such catalysts may be satisfactorily active when first prepared, they rapidly lose activity on repeated regeneration and they are also frequently unable to withstand even the minimum of handling and attendant abrasion which is necessary in the usual commercial operation of a heterogeneous catalytic process. We have now found that if, instead of depositing the molybdenum component on the surface and in the pores of a carrier, it is combined or coprecipitated with the other ingredients which it is desired to include in the catalyst composition, a catalyst having marked superiority in activity, in length of active life and in its ability to withstand crushing and abrasion can be produced. For instance, when a molybdenum component is precipitated together with an aluminum component from an aqueous solution containing soluble compounds of these two elements and the resulting precipitate is thoroughly washed, carefully dried and properly heat treated, a compound catalyst is produced which has very superior properties, when employed in the reforming of gasoline for the antiknock improvement thereof, and particularly in the production of substantially pure aromatic liquids from low boiling petroleum distillates.

It is accordingly an object of this invention to provide an improved process for the treatment of low boiling hydrocarbons with an improved type of molybdenum-containing catalyst wherein a compound of that element is combined and coprecipitated with a compound of aluminum and the resulting precipitate is further treated to produce a more active and more durable catalyst for use in heterogeneous hydrocarbon reactions than has heretofore been available from these elements. It is also an object to provide a method of producing this molybdenum-aluminum catalyst whereby the combinations of greatest activity and highest durability may be realized. It is a further object of our invention to provide a molybdenum-aluminum compound material of great catalytic activity and long active life which is at the same time of sufficient purity and in such physical form as to be capable of compression into catalyst forms that are suited to practical use and have sufficient resistance to crushing and to abrasion to withstand the usual hazards of industrial service throughout the catalytically active life of the component materials.

In preparing the coprecipitated molybdenum-containing catalysts of the present invention, we have found that the characteristics of the salts from which molybdenum and aluminum components are derived, the concentration of the solutions from which the coprecipitate is deposited, the conditions of precipitation, the method of collecting and purifying the precipitate, and the procedure employed in washing, drying, grinding, pelleting and calcining the precipitated material are all significant to the preparation of the most active and the longest-lived catalysts. It has further been found that in order to realize the greatest activity and the longest catalyst life, the foregoing variables must be so correlated as to produce a finished catalyst consisting essentially of a solid solution of molybdic oxide in gamma alumina containing relative larger pore spaces and a crystal lattice constant of somewhat greater dimensions than is found in the catalysts of more or less similar empirical composition that have hitherto been disclosed for similar uses and prepared by depositing and supporting the molybdic oxide on preformed and activated alumina.

As a source of the aluminum component we have found that aluminum chloride, either anhydrous or hydrated, aluminum acetate or aluminum nitrate may be used with about equal results. Taking aluminum chloride as typical, we have found that a solution containing about 6% $AlCl_3$ by weight or approximately 0.52 pound per gallon is particularly suited to our purpose though solutions containing from about 0.05 to about 2.5 pounds per gallon may be found suited to certain special conditions. It has been found that the molybdenum component of the coprecipitated catalyst may be supplied from a solution of ammonium molybdate, $(NH_4)_2MoO_4$; ammonium dimolybdate, $(NH_4)_2Mo_2O_7$; or ammonium heptamolybdate, $(NH_4)_6Mo_7O_{24}$, as may be most convenient. If these ammonium salts are not vailable as such, as entirely satisfactory solution for use in preparing our preferred catalysts may be easily had by dissolving either molybdic acid or molybdic anhydride in the appropriate quantity of aqueous ammonia. When the heptamolybdate is employed it has been found to give most satisfactory results at about 1.6 pounds per gallon of solution, though solutions ranging from about 0.2 to 8.0 pounds per gallon may sometimes be employed.

Precipitation of the crude catalyst material is effected by mixing the aluminum- and the molybdenum-containing solutions in the proportions to give the desired percentage of molybdenum in the finished catalyst, as explained in a later paragraph, and adding to the mixture a solution of aqueous ammonia until precipitation is complete. The reverse order of addition may also be employed. Another satisfactory procedure is to first mix the ammonia and the molybdenum salt solutions and then to add this mixture to the aluminum chloride solution or to add the aluminum chloride solution to the mixture. When employing the solutions above described at the preferred concentrations there given, it has been found that an ammonia solution containing about 10% to 15% $NH_3$ is particularly suited to effect the precipitation, though it will be appreciated that with other strengths of salt solutions either weaker or stronger ammonia solution may be preferably.

It has been found that markedly superior results are obtained when the precipitation is approached from the acid side with respect to the aluminum component, as will be the case when the precipitation is from a solution of an aluminum salt of an intermediate or strong acid such as aluminum chloride. It has been found that when the aluminum chloride solution or its mixture with the ammonium molybdate solution has an initial pH of about 4.0 or below and the ammonia containing solution is added slowly with vigorous agitation until a pH of about 8.0 is reached, the most active and most durable catalyst material is produced.

Not only is the approach to precipitation of the alumina from the acid side, as just described, a significant feature of the present invention but we have also determined that the substantial absence of any alkali metal component, and particularly of a sodium component, from the molybdenum-aluminum coprecipitate is essential in order that the catalysts made therefrom may have maximum activity and maximum life. It has, for instance, been found that 0.6% of sodium oxide included in a molybdenum-aluminum coprecipitate will reduce its activity to about 60% of that of a catalyst containing no alkaline oxide. It is thus necessary for best results to keep the sodium content, expressed as metal, below about 0.1% and preferably below 0.05% by weight of the catalyst.

While this desired low sodium content may possibly be secured when precipitation is from an alkaline solution, such as the customary solution of sodium aluminate, if resort is had to long and thorough washing of the precipitate, such procedure is not only troublesome, time consuming and expensive but inefficient in that substantial quantities of the molybdenum component will also be washed away. Precipitation from an acid solution of the appropriate salts, utilizing ammonia as the sole alkaline reagent as already described, thus not only results in a more rapid and more convenient but also in a more economical process and a more active catalyst than has hitherto been described.

The precipitate, thus carefully prepared, and especially when the less concentrated solutions of the reacting salts are used, is a thoroughly homogeneous flocculent mass or weak gel which is readily broken up and collected for further processing. The best evidence available from X-ray studies of the washed and calcined precipitate indicates the material to consist of a uniform solid solution of molybdenum oxide in an excess of gamma alumina. No molybdic oxide as such is to be found in the product. This fact is believed to be one of the fundamental reasons for the desirable characteristics of our preparation. In any event the coprecipitate from an acid solution, as further brought out hereinafter, yields on proper handling a catalyst which is far superior to the best hitherto disclosed molybdenum catalysts consisting of molybdenum oxide supported on an appropriate carrier. It will thus be understood that when we herein refer to the catalysts of this invention as "coprecipitated" molybdenum-aluminum compositions, the term is intended to comprehend the material produced according to the method specifically set forth or its reasonable equivalent irrespective of whether it is merely a mixture of separate compounds of the two elements, a solution of the one oxide in the other or whether a definite compound can be shown to exist between them.

At least a suggestion of compound formation is to be found in the fact that in the preferred range of precipitation wherein the atomic ratio of aluminum to molybdenum in the precipitating solutions is between about 15 and 25 to 1, moderate variations in the proportions of molybdenum and aluminum result in precipitates which, when washed substantially free of soluble salts, contain a more nearly constant quantity of molybdenum than would ordinarily be expected. This apparent transitory or pseudo equilibrium composition contains between about 6 and 8% by weight of molybdenum, expressed as the element. It has been found that material of this composition is particularly well adapted to the preparation of catalysts for the production of aromatics.

After precipitation is complete at a pH of about 8.0, it has been found that subsequent handling is very much facilitated if the suspension is permitted to stand for a period of several hours in order to permit the finer particles to coagulate. The solid may then be readily collected by either filtration or decantation methods as usually employed. When decantation is used, from two to as many as five or six washings may be necessary in order that the ammonium chloride content of the finally dried product will be sufficiently low to give the most serviceable material. The same result may be effected by filtration separation if the filter cake is redispersed in pure water and recollected several times. Whichever method is employed, the washing should be continued to such an extent that the product when substantially dried will invariably contain less than 10% of ammonium chloride in order that the product may be compressed into catalyst shapes that retain a high proportion of their mechanical strength after the degree of heat treatment that is necessary to bring the catalyst to its condition of maximum activity.

In a typical instance, starting from aluminum chloride and ammonium heptamolybdate solutions the first filter cake was found to contain 87% water, 6% ammonium chloride, and 7% of the desired coprecipitate. On being dispersed in fresh water and refiltered, the cake contained about 90% water, 2% ammonium chloride, and 8% coprecipitate, and on second redispersion and collection contained 92% water, 0.6% ammonium chloride, and 7.4% coprecipitate. On a water free basis this last product will be seen to contain but 7.5% of ammonium chloride.

The finally washed filter cake should be broken up and dried until it contains no more than about 30% water. This preliminary drying step can be accomplished at any suitable temperature between about 100° and about 850° F. or above. The thus dried material is a white solid which, in contrast to some of the hard glassy gels previously disclosed may be ground to an easily pelleted powder. It will preferably contain about 74% of the moylbdenum-aluminum coprecipitate and about 6% or less of ammonium chloride.

The total content of components in this preliminarily dried product that are volatilized on calcining is extremely significant to the next succeeding step of pelleting and should always be between about 20 and 30% and preferably between 24 and 28% in order to give pellets of the maximum strength for a given pressure applied in their preparation.

The catalyst dried to a water content of about 20% is ground to produce a powder having more or less the following mesh analysis:

| | Per cent |
|---|---|
| Through 50 mesh | 100 |
| Through 100 mesh | 75 |
| Through 200 mesh | 34 |

If ground substantially finer than this the pellets subsequently produced are unsatisfactory because of splitting, while coarser material is not so easily handled in the step of pellet preparation. If, however, a lubricant is added to the powder before pelleting, some additional leeway may be possible in the suitable range of powder dimensions. It has been found that a few per cent (usually between 1 and 10%) of powdered graphite, of stearic acid, of bentonite, of rosin or of a saturated high boiling hydrocarbon oil, will serve as a satisfactory lubricant, the exact material and quantity depending somewhat on the composition of the catalyst and the specific service in which it is to be used.

The dried powder containing the desired lubricant is next compressed into pellets of any desired shape, as for instance cylinders, spheres or various rectilinear shapes by means of any suitable tablet or pill machine. Pellets varying from about 0.1 to 0.75 inch in their longest dimension have been found well suited for use in the hydrocarbon reactions contemplated. The pressure employed to produce the pellets should be sufficient to give good mechanical strength but not enough to produce such dense particles that their catalytic activity is materially reduced. For instance, cylindrical particles having rounded ends and a diameter of 0.187 inch have been prepared with a crushing strength well above 40 pounds as measured by subjecting them to a uniformly increasing pressure applied through a steel plunger having a diameter of 0.02 inch. However, it has been found that at higher compressions some loss in activity may be expected. Strengths from about 6 to 25 pounds have been found quite satisfactory, with about 12 to 15 pounds being the preferred figure for catalyst particles of the foregoing range of sizes.

The arbitrary unit of "crushing strength" just referred to is more convenient to measure and use for comparative purposes than the customary more cumbersome figure for compression strength as measured on a special sample between flat plates. The relation between the crushing strength of the catalysts of our invention as employed here and their compression strength is substantially linear and of the following magnitude:

| Crushing Strength | Compression Strength |
|---|---|
| Pounds | p. s. i. |
| 10 | 3,600 |
| 20 | 7,200 |
| 40 | 14,200 |

The catalyst pellets must be subjected to a final calcining step before they are ready for use in order to remove the residual ammonium chloride and water. The temperature of calcining may be conveniently at about 1100° F. or above, and we have found a preferable procedure to be a slow heating of approximately three hours to reach this temperature, followed by at least two hours of constant temperature at that point. This removes ammonium chloride and water but, of course, not the graphite added, as pointed out above, which inherently and necessarily under these conditions remains present in the finished catalyst, producing a catalyst having superior properties, particularly one having a higher activity for a longer period of time, that is, a longer life. While various other procedures for calcining may be employed as conditions dictate, it has been found that the minimum satisfactory calcination requires at least three hours at 800° F. and the maximum may be for as long as 150 hours or more at temperatures as high as 1300° F.

As pointed out above, the finished catalyst containing graphite is superior in that it has a higher activity for a longer period of time. Evidence indicates that this may be due to a reducing effect of the graphite present in the catalyst while in use. It appears that during regeneration, when the carbonaceous deposit is burned from the catalyst with an oxygen-containing gas, the graphite has the effect of lowering the tendency of the metallic component, such as molybdenum, to be oxidized to a higher state of oxidation, which higher state of oxidation has a disadvantageous effect upon the catalyst.

Graphite may also be used in the finished catalyst material where, instead of the molybdenum component as described above, other metallic components may be used, preferably in the oxide form as with the molybdenum component, including metals of groups V and VI, particularly vanadium, chromium and tungsten. Moreover, graphite will be found advantageous in the catalyst material where there is present a component susceptible to an undesirably high stage of oxidation when subjected to the oxygen-containing gas for regeneration with a resultant lowering of the effectiveness of the catalyst or its life. This feature is of great importance, particularly for catalysts which are used in a cyclic process involving on-stream and regeneration periods where the regeneration is effected with an oxidizing agent such as air usually with a controlled oxygen content. Instead of the aluminum component as described above, other components such as silica, beryllia, zinc oxide, etc., may be used in the combination with graphite. Moreover, advantages of graphite may be obtained when the catalyst material is made by other methods such as by impregnating an activated alumina or an alumina gel with the other metallic components as with molybdenum oxide, for example.

This ability of the catalysts of our present invention to withstand long periods of heating at high temperatures and in fact to gain in catalyst activity by reason of such treatment, with substantially no loss in mechanical strength, is one of their points of outstanding superiority over other known catalysts in this field. We have in fact adopted a standard accelerated life test that all of our catalysts must pass before being considered suitable for commercial use. This test requires that the catalyst show the same or increased activity after being held for one week (168 hours) at 1300° F. as it had before heating. Catalysts of the impregnated type wherein molybdenum oxide is supported on activated alumina are substantially sintered and lose practically all of their catalytic activity when subjected to such treatment.

The large immediate practical advantage derived from this ability of our catalysts to withstand high temperatures is, of course, in connection with the regeneration treatment for removal of carbon which collects on the catalyst during use. With former catalysts of the supported type the temperature of reburning had to be rigorously kept below above 1200° F. in order to prevent serious loss in activity of the catalyst. In order to realize this end, elaborate precautions had to be taken and provision made to carry away the heat of the reaction. By contrast the thermally more rugged catalysts of our invention require much less careful temperature control during the reburning operation and thus permit a substantial increase in the speed of this operation.

Instead of proceeding by way of the precipitation and washing steps previously described, it may sometimes be found desirable to effect the precipitation from substantially more concentrated solutions than those indicated as preferable and then to subject the whole mass, without any attempt at filtration, to the preliminary drying step, after which the ammonium chloride and other impurities may be eliminated by extraction or other suitable methods of leaching. While the filtration step and the apparatus necessary therefor may thus be eliminated, the saving in apparatus is at least in part offset by the additional drying step required.

An idea of the superiority of the coprecipitated catalysts of the present invention over the best previously known molybdic oxide on activated alumina catalysts may be had from the data presented in the following table which were obtained in reforming the same charging stock under wholly comparable conditions:

It will be noted that not only were the fresh coprecipitated catalysts from 25% to 65% more active than the best supported catalyst but the activity actually increased in the accelerated life test (168 hours @ 1300° F.) by several per cent while that of a supported catalyst decreased by about 92%.

Some further understanding of the nature of the catalysts of the present invention and their relation to the supported molybdic oxide catalysts of the prior art may be had from the following X-ray and adsorption data:

*Comparison of catalysts*

|  | Coprecipitated | Supported |
|---|---|---|
| Surface area; sq. meters per gram: |  |  |
| Fresh Catalyst (Granular) | 117 | 195 |
| Fresh Catalyst, pelleted | 97 |  |
| After 168 hrs. @ 1300° F | 79 | 5 |
| Lattice Constant; Angstrom Units: |  |  |
| Fresh Catalyst | 7.92–8.09 | 7.86 |
| After 168 hrs. @ 1300° F | 7.89 | 7.86 |
| Pore diameter; Angstrom Units: |  |  |
| Fresh Catalyst | 42 | 15 |
| After 168 hrs. @ 1300° F | 61 | Sintered |
| Relative Activity (as defined hereinabove): |  |  |
| Fresh Catalyst | 90 | 52 |
| After 168 hrs. @ 1300° F | 120 | 4 |
| Crushing strength, pounds: |  |  |
| Fresh Catalyst | 12.5 | 5.7 |
| After 168 hrs. @ 1300° F | 9.0 | 1.5 |

While the substantially complete loss of catalytic activity by the supported catalysts is consistent with and apparently attendant upon the almost complete collapse of the catalyst pore structure, the ultimate cause of this condition is probably to be found in a more fundamental condition which is revealed only by an X-ray analysis. The lattice constant for gamma alumina in terms of our present apparatus is 7.86 Å. This will be seen to be exactly the same as that for the supported molybdic oxide catalysts both before and after heat treatment. It is therefore apparent that the association of the molybdic oxide with the alumina is not sufficiently deep seated to alter the fundamental structural arrangement of the alumina molecules. The relationship is thus only superficial and the catalytic effect might well be expected to be more or less fugitive. On the contrary, the molybdenum compound in the coprecipitated catalysts is so tied into the fundamental arrangement of molecules as to cause a small but real alteration in the dimensions of the ultimate crystal unit. Whatever the catalytic effect of such a change, it would certainly be expected to be an enduring effect.

As a further example of the remarkable utility of the catalysts of this invention, a pelleted, co-

*Heat treatment of catalysts*

| Catalyst | Treatment | Relative Activity [1] |
|---|---|---|
| MoO₃ on Grade A Activated Alumina (prepared by impregnation). | Heated 5 hours at 900° F. in air | 60 |
| same | Heated 164 hours at 1200° F. in air | 55 |
| same | Heated 331 hours at 1200° F. in air | 51 |
| same (another similar preparation) | Heated 5 hours at 900° F. in air | 52 |
| same | Heated 168 hours at 1300° F. in air | 4 |
| Granular Coprecipitated Molybdenum-Alumina | Fresh, heated 2 hours at 1100° F. in air | 75 |
| same | Heated 168 hours at 1200° F. in air | 112 |
| same | Heated 335 hours at 1200° F. in air | 110 |
| same (another preparation) | Fresh, heated 2 hours at 1100° F. in air | 85 |
| same (another preparation) | Fresh, heated 2 hours at 1100° F. in air | 98 |
| same, pelleted to 3/16" pills | Fresh, heated 2 hours at 1100° F. in air | 100 |
| same, pelleted to 3/16" pills | Heated 168 hours at 1300° F. in air | 107 |

[1] Relative activity is proportional to the feed rate required to obtain a given conversion of 180°–230° F. fraction from Kettleman crude to aromatics under a given set of conditions.

precipitated molybdenum-aluminum catalyst, prepared according to the foregoing procedure and containing 9.2% molybdenum (calculated as metal) was employed in the first catalyst stage of a two-stage process for the production of toluene from a selected fraction of California petroleum. In this operation a distillate boiling between about 180° and 230° F. was passed over the catalyst at a temperature of about 955° F. under a pressure of 115 p. s. i. at a charging rate of about one volume of liquid per volume of catalyst per hour and in the presence of a carrier gas containing about three molecules of hydrogen per molecule of the hydrocarbon charge. A cut boiling between 227 and 232° F. amounting to 20.5% of the charge and having an aniline point of −78° F. was recovered from the liquid reaction product.

While the utility of our novel coprecipitated molybdenum-aluminum catalyst materials has been illustrated with reference to the dehydrogenation and aromatization of a petroleum distillate for the production of toluene, they are also highly active in the reforming and desulfurization of naphtha stocks, in the dehydrogenation of cyclic hydroxy compounds such as cyclohexanol, in the cyclization of straight chain compounds such as heptane and in ring closure and dehydrogenation, such as in the conversion of butyl benzene to naphthalene. They are also useful in the dehydrogenation of ethyl benzene to styrene and of butane and butene to butadiene.

Having now described and exemplified a new group of catalysts comprising coprecipitated molybdenum and aluminum components having superior activity and long life in dehydrogenation, reforming, cyclization and related reactions and having fully described practical methods of preparing these coprecipitated catalysts, we claim:

1. In the process of producing dehydrogenation catalyst pellets from a catalytic material comprising predominantly coprecipitated alumina and molybdenum oxide, the improvement which comprises mixing a minor proportion of graphite between about 1 to 10% by weight with the catalyst material prior to pelleting, calcining the resulting pellets by heating for about 3 hours to reach a temperature of about 1100° F. followed by about 2 hours at about 1100° F., thus removing volatile constituents but leaving graphite present in the catalyst as employed in said dehydrogenation.

2. A process of dehydrogenating a hydrocarbon oil which comprises contacting said oil with a catalyst consisting of a pelleted mixture including a minor proportion of graphite between about 1 to 10% by weight, alumina in major part and a catalytic component comprising molybdenum oxide, for a period of time sufficient to deposit carbon on said catalyst whereby its activity is lowered and regeneration thereof made necessary, regenerating said catalyst by contacting with an oxygen-containing gas at an elevated temperature to remove said carbon deposits by combustion, during which operation said graphite functions to prevent said molybdenum oxide from attaining an undesirably high degree of oxidation.

WILLIAM H. CLAUSSEN.
HOMER B. WELLMAN.

REFERENCES CITED

The following references are of record in the file of this patent:

UNITED STATES PATENTS

| Number | Name | Date |
|---|---|---|
| 2,120,723 | Watson | June 14, 1938 |
| 2,128,120 | Dunstan | Aug. 23, 1938 |
| 2,146,718 | Bond | Feb. 14, 1939 |
| 2,197,707 | Crittenden | Apr. 16, 1940 |
| 2,209,492 | Spicer | July 30, 1940 |
| 2,211,208 | Ipatieff et al. | Aug. 13, 1940 |
| 2,232,610 | Joshua et al. | Feb. 18, 1941 |
| 2,271,751 | Visser et al. | Feb. 3, 1942 |
| 2,274,633 | Pitzer | Mar. 3, 1942 |
| 2,288,336 | Welty, Jr. | June 30, 1942 |
| 2,311,979 | Corson | Feb. 23, 1943 |
| 2,322,863 | Marschner et al. | June 29, 1943 |
| 2,325,287 | Thomas | July 27, 1943 |
| 2,345,600 | Heard et al. | Apr. 4, 1944 |
| 2,348,624 | Hillman | May 9, 1944 |
| 2,371,087 | Webb et al. | Mar. 6, 1945 |